(12) United States Patent
Alloh

(10) Patent No.: US 11,589,014 B2
(45) Date of Patent: Feb. 21, 2023

(54) REMOTELY FLYABLE MINERAL DETECTION ASSEMBLY

(71) Applicant: Duke Alloh, Tukwila, WA (US)

(72) Inventor: Duke Alloh, Tukwila, WA (US)

(*) Notice: Subject to any disclaimer, the term of this patent is extended or adjusted under 35 U.S.C. 154(b) by 127 days.

(21) Appl. No.: 17/308,616

(22) Filed: May 5, 2021

(65) Prior Publication Data

US 2022/0360747 A1    Nov. 10, 2022

(51) Int. Cl.
*H04N 7/18*   (2006.01)
*H04Q 9/00*   (2006.01)
*G01S 19/01*   (2010.01)
*B64C 39/02*   (2006.01)
*G06V 20/13*   (2022.01)

(52) U.S. Cl.
CPC ........... *H04N 7/185* (2013.01); *B64C 39/024* (2013.01); *G01S 19/01* (2013.01); *G06V 20/13* (2022.01); *H04Q 9/00* (2013.01); *B64C 2201/027* (2013.01); *B64C 2201/123* (2013.01); *H04Q 2209/40* (2013.01)

(58) Field of Classification Search
CPC ................. H04N 7/185; B64C 39/024; B64C 2201/027; B64C 2201/123; G01S 19/01; G06V 20/13; H04Q 9/00; H04Q 2209/40
See application file for complete search history.

(56) References Cited

U.S. PATENT DOCUMENTS

| | | | |
|---|---|---|---|
| 9,405,533 B2 | 8/2016 | Bouzas | |
| 10,192,182 B2 | 1/2019 | Whipple | |
| 10,222,338 B1 | 3/2019 | Wilk | |
| D858,353 S | 9/2019 | Gan | |
| 2011/0066379 A1 | 3/2011 | Mes | |
| 2016/0180126 A1 | 6/2016 | Saleem | |
| 2016/0306063 A1* | 10/2016 | Hyde | G01S 7/412 |

FOREIGN PATENT DOCUMENTS

WO    WO2015105851    7/2015

* cited by examiner

*Primary Examiner* — Nam D Pham

(57) ABSTRACT

A remotely flyable mineral detection assembly for aerial detection of mineral deposits includes a drone, which comprises a first transceiver and can be remotely controlled and flown above a search area. A sensing module and a camera, which are engaged to an underside of a central hub of the drone, detect electromagnetic radiation emanating from and capture an image of, respectively, a subarea within the target area. A microprocessor and a second transceiver are engaged to and are positioned in the central hub. The second transceiver is global positioning system enabled. The microprocessor is operationally engaged to a battery of the drone, the second transceiver, the first transceiver, the sensing module, and the camera. The microprocessor selectively motivates the first transceiver to communicate an electromagnetic sensing output, coordinates, and an image corresponding to the subarea, to an electronic device of a user.

9 Claims, 6 Drawing Sheets

REMOTELY FLYABLE MINERAL DETECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mineral detection assemblies and more particularly pertains to a new mineral detection assembly for aerial detection of mineral deposits. The present invention discloses a mineral detection assembly engaged to a drone, which comprises sensors for detecting minerals in a subarea within a target area, a GPS unit to obtain coordinates of the subarea, and a camera to capture an image of the subarea.

(2) Description of Related Art Including Information Disclosed Under 37 CFR 1.97 and 1.98

The prior art relates to mineral detection assemblies, and in particular mineral detection assemblies engaged to drones. Such prior art mineral detection assemblies have been directed to oilfield exploration and monitoring, for detection of minerals released by burning plant materials, for measuring elective field and magnetic field strengths to detect underground anomalies. What is lacking in the prior art is a mineral detection assembly engaged to a drone comprising sensors for detecting minerals in a subarea within a target area, a GPS unit to obtain coordinates of the subarea, and a camera to capture an image of the subarea.

BRIEF SUMMARY OF THE INVENTION

An embodiment of the disclosure meets the needs presented above by generally comprising a drone, which comprises a first transceiver so that the drone is configured to be remotely controlled and flown above a search area. A sensing module is engaged to an underside of a central hub of the drone and is configured to detect electromagnetic radiation emanating from a subarea within the target area. A camera is engaged to the underside of the central hub and is configured to selectively capture an image of the subarea. A microprocessor and a second transceiver are engaged to and are positioned in the central hub of the drone. The second transceiver is global positioning system enabled and thus is configured to receive and to send coordinates corresponding to a location of the subarea. The microprocessor is operationally engaged to a battery of the drone, the second transceiver, the first transceiver, the sensing module, and the camera. The microprocessor is positioned to selectively motivate the first transceiver to communicate an electromagnetic sensing output, coordinates, and an image corresponding to the subarea, to an electronic device of a user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

Figure 3:
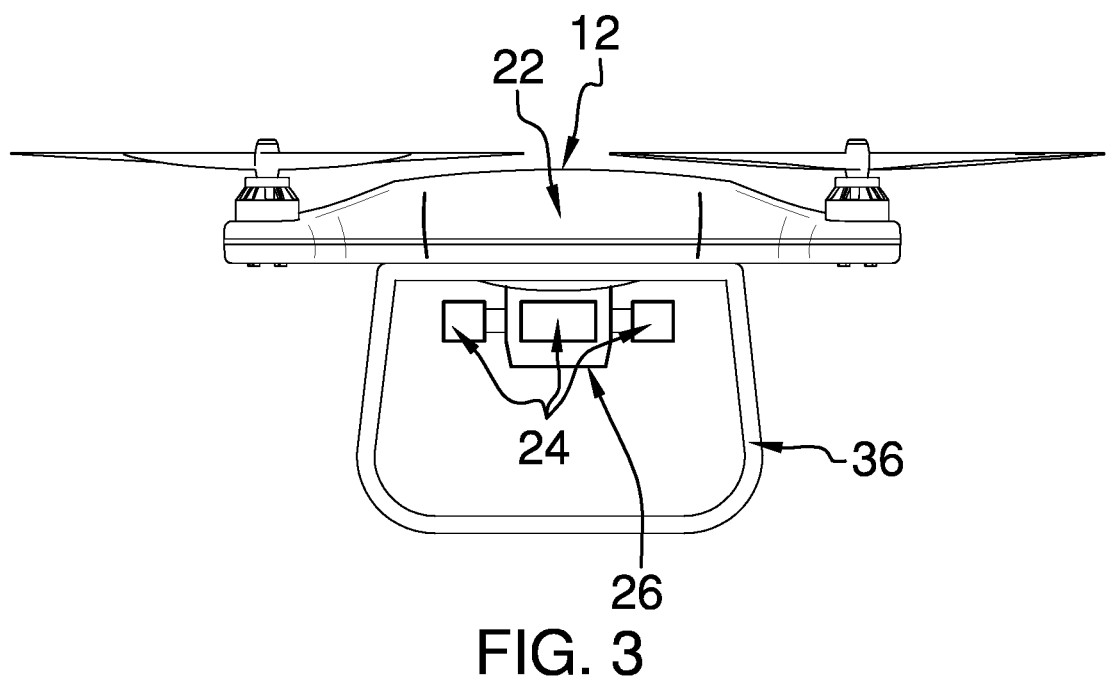
Figure 4:
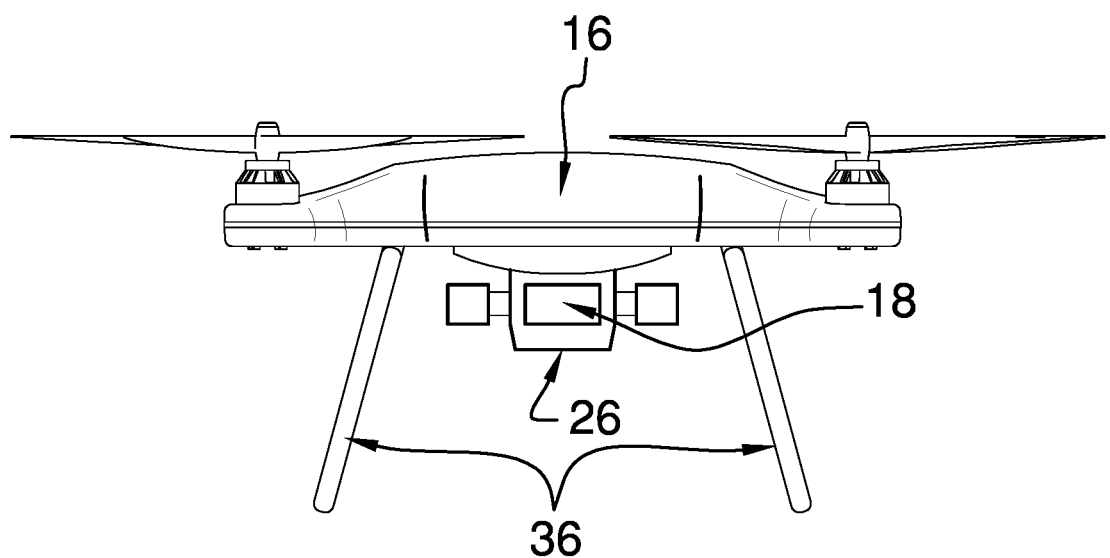
Figure 5:
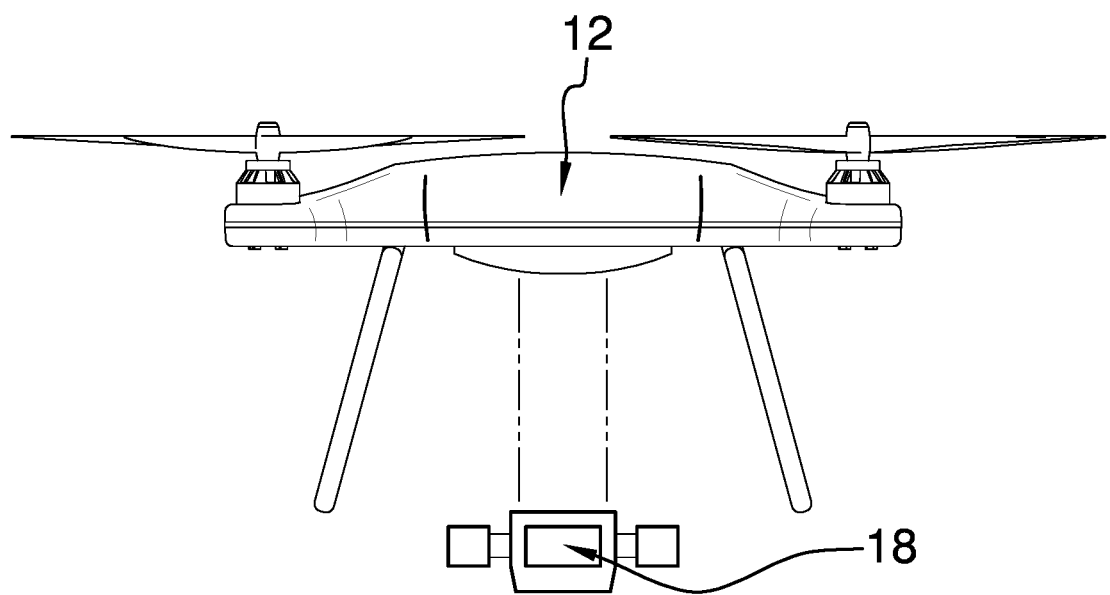
Figure 6:
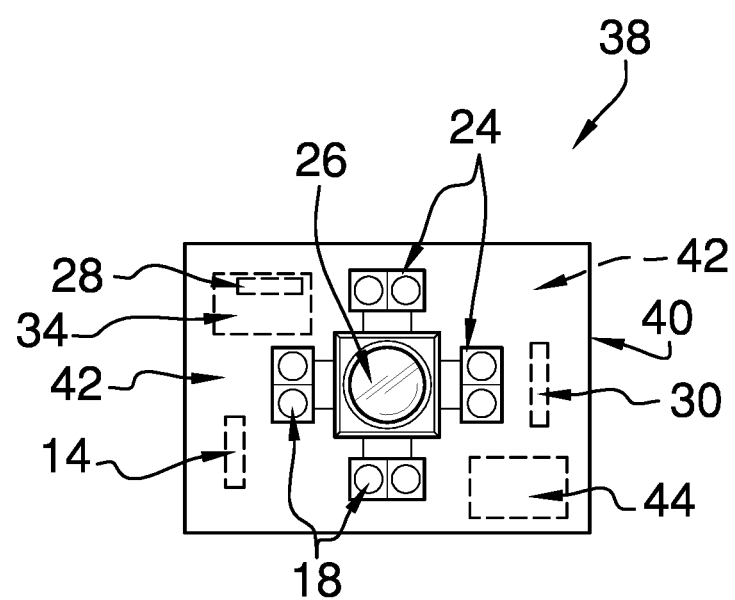

FIG. 3 is a side view of an embodiment of the disclosure.
FIG. 4 is a side view of an embodiment of the disclosure.
FIG. 5 is a side view of an embodiment of the disclosure.
FIG. 6 is a bottom view of an embodiment of the disclosure.

DETAILED DESCRIPTION OF THE INVENTION

With reference now to the drawings, and in particular to FIGS. 1 through 6 thereof, a new mineral detection assembly embodying the principles and concepts of an embodiment of the disclosure and generally designated by the reference numeral 10 will be described.

Figure 1:
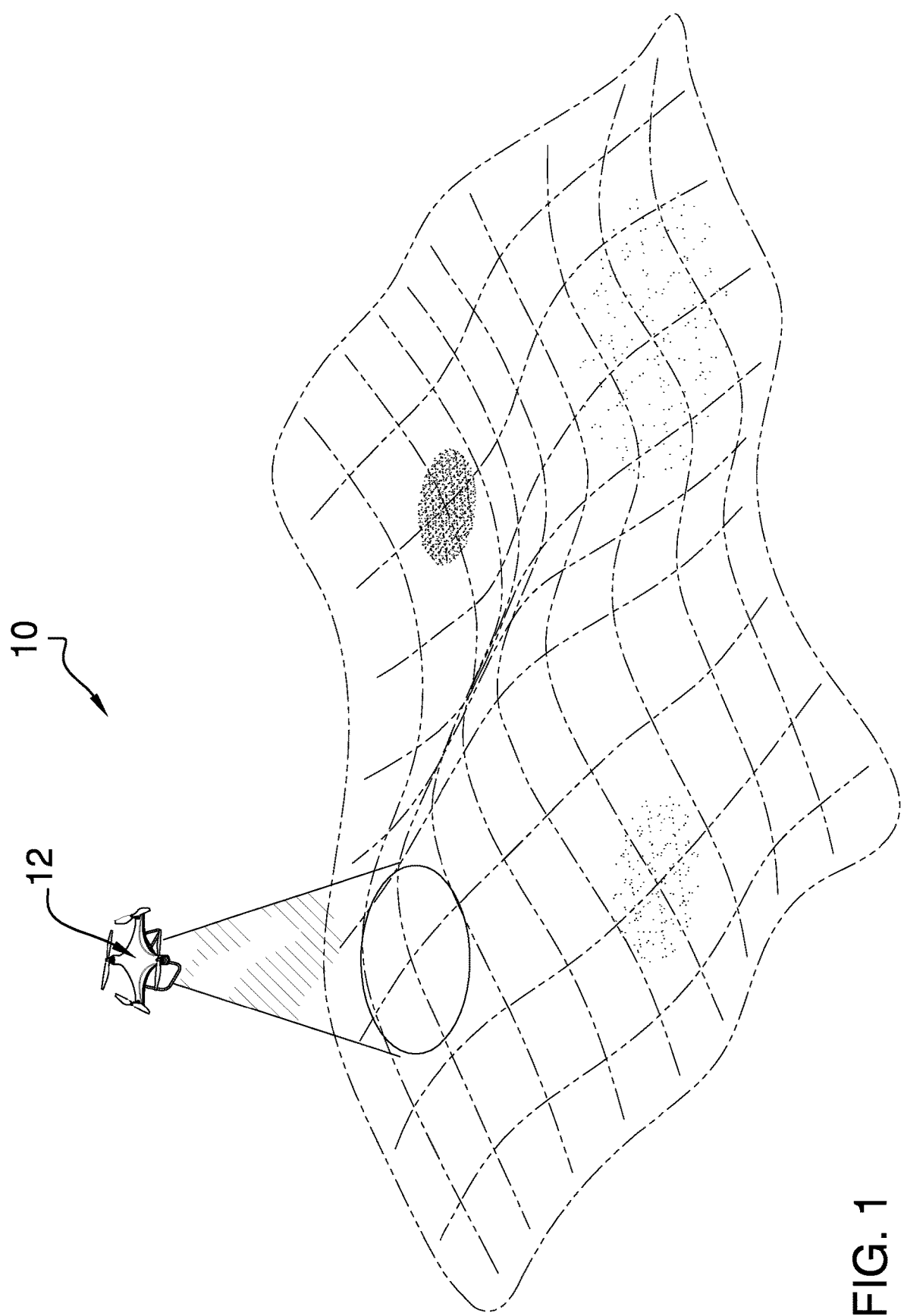
FIG. 1 is an in-use view of a remotely flyable mineral detection assembly according to an embodiment of the disclosure.
Figure 2:
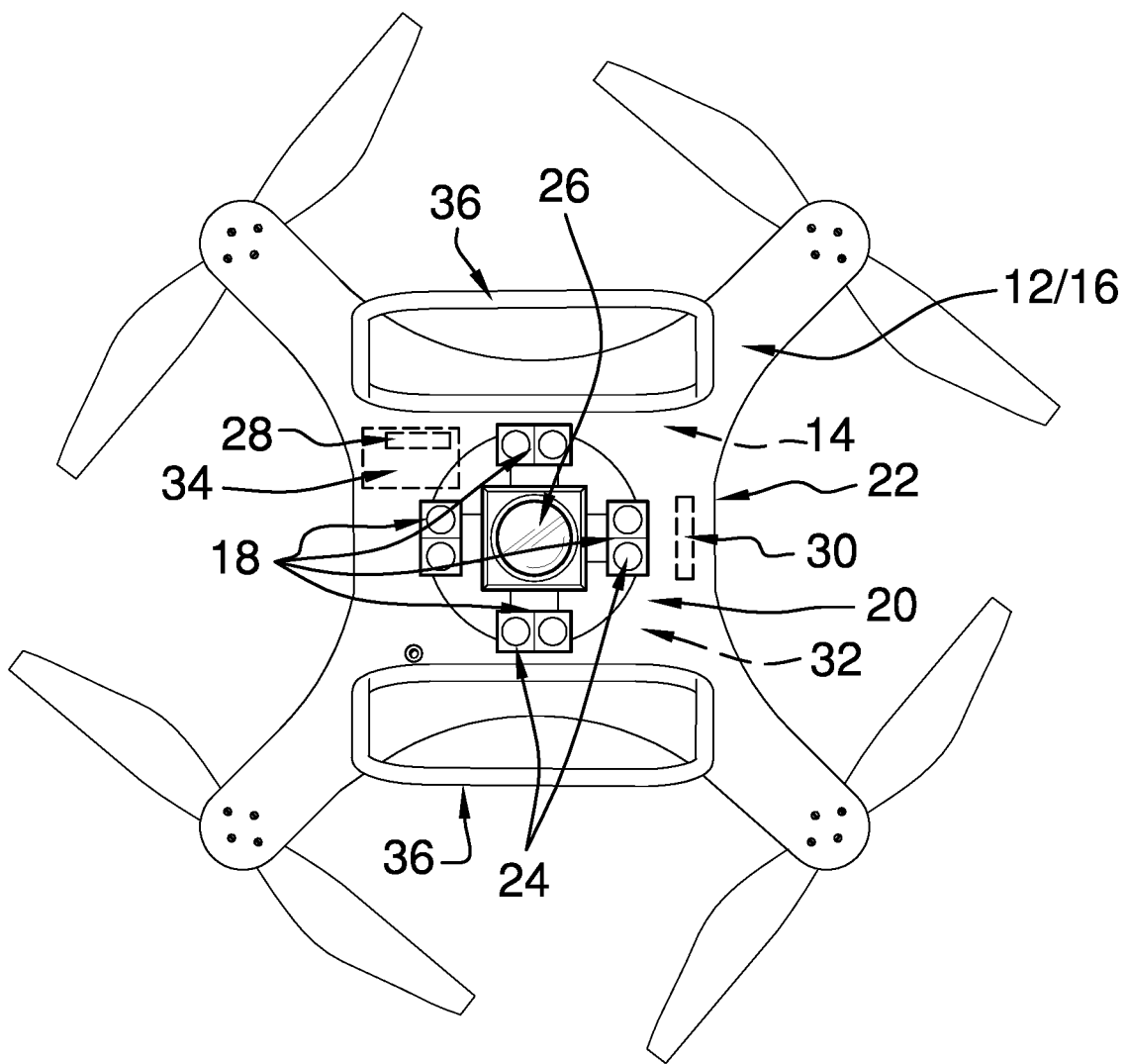
FIG. 2 is a bottom view of an embodiment of the disclosure.

As best illustrated in FIGS. 1 through 6, the remotely flyable mineral detection assembly 10 generally comprises a drone 12, which comprises a first transceiver 14 so that the drone 12 is configured to be remotely controlled and flown above a search area. The drone 12 may comprise a quadcopter 16, a type of multirotor drone as shown in FIG. 2, so that the drone 12 is configured for hovering. The drone 12 may comprise other types of hovering drone, such as, but not limited to, other multirotor drones having less than or more than four rotors, and fixed wing hybrid drones.

A sensing module 18 is engaged to an underside 20 of a central hub 22 of the drone 12 and is configured to detect electromagnetic radiation emanating from a subarea within the target area. The sensing module 18 also may comprise sensors 24 configured for one or more of fault detection, fracture detection, hydrothermal rock alteration, and ionizing radiation. Along with electromagnetic radiation, faults, fractures, hydrothermal rock alterations, and ionizing radiation are indicators of mineral deposits of various types.

A camera 26 is engaged to the underside 20 of the central hub 22 and is configured to selectively capture an image of the subarea. A microprocessor 28 and a second transceiver 30 are engaged to and are positioned in the central hub 22 of the drone 12. The second transceiver 30 is global positioning system enabled and thus is configured to receive and to send coordinates corresponding to a location of the subarea. The microprocessor 28 is operationally engaged to a battery 32 of the drone 12, the second transceiver 30, the first transceiver 14, the sensing module 18, and the camera 26. The microprocessor 28 is positioned to selectively motivate the first transceiver 14 to communicate an electromagnetic sensing output, coordinates, and an image corresponding to the subarea, to an electronic device of a user.

A data storage module 34 is engaged to and positioned in the central hub 22 of the drone 12. The data storage module 34 is operationally engaged to the microprocessor 28. The microprocessor 28 is positioned to selectively send the electromagnetic sensing output, the coordinates, and the image corresponding to the subarea to the data storage module 34.

A set of legs 36 is engaged to and extends from the underside 20 of the central hub 22. The legs 36 bracket and extend past the sensing module 18 and the camera 26. The legs 36 are configured to prevent the sensing module 18 and the camera 26 from contacting a surface upon landing of the drone 12 on the surface.

The present invention also anticipates a mineral detection assembly 38 comprising a housing 40, which defines an interior space 42. The housing 40 is configured to be mounted to an underside 20 of a drone 12, which is configured to be remotely controlled and flown above the search area. The sensing module 18 and the camera 26 are engaged to the housing 40.

The microprocessor 28, a power cell 44, the first transceiver 14, and the second transceiver 30 are engaged to the housing 40 and are positioned in the interior space 42. The first transceiver 14 is configured for wireless communication with the electronic device of the user. As with the remotely flyable mineral detection assembly 10, the second transceiver 30 is global positioning system enabled. The microprocessor 28 is operationally engaged to the power cell 44, the first transceiver 14, the second transceiver 30, the sensing module 18, and the camera 26. The microprocessor 28 is positioned to selectively motivate the first transceiver 14 to communicate the electromagnetic sensing output, the coordinates, and the image corresponding to the subarea to the electronic device of the user.

As with the remotely flyable mineral detection assembly 10, the sensing module 18 also may comprise sensors 24 configured for one or more of fault detection, fracture detection, hydrothermal rock alteration, and ionizing radiation. The data storage module 34 is engaged to the housing 40 and is positioned in the interior space 42. The data storage module 34 is operationally engaged to the microprocessor 28. The microprocessor 28 is positioned to selectively send the electromagnetic sensing output, the coordinates, and the image corresponding to the subarea to the data storage module 34.

In use, the drone 12 is flown over an area of interest for mineral exploration. The sensors 24 scan the area and pick up one or more of electromagnetic radiation, faults, fractures, hydrothermal rock alterations, and ionizing radiation, if present, in a subarea. The results, along with GPS coordinates and an image of the subarea, are transmitted to the electronic device of the user. The present invention enables mineral exploration that does not require the user to be physically present, which improves safety and reduces time requirements.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A remotely flyable mineral detection assembly comprising:
   a drone, the drone comprising a first transceiver, such that the drone is configured for being remotely controlled for flying the drone above a search area;
   a sensing module engaged to an underside of a central hub of the drone and being configured for detecting electromagnetic radiation, wherein the sensing module is configured for detecting electromagnetic radiation emanating from a subarea within the target area;
   a camera engaged to the underside of the central hub, wherein the camera is configured for selectively capturing an image of the subarea; and
   a microprocessor and a second transceiver engaged to and positioned in the central hub of the drone, the second transceiver being global positioning system enabled, such that the second transceiver is configured for receiving and sending coordinates corresponding to a location of the subarea, the microprocessor being operationally engaged to a battery of the drone, the second transceiver, the first transceiver, the sensing module, and the camera, such that the microprocessor is positioned for selectively motivating the first transceiver for communicating an electromagnetic sensing output, coordinates, and an image corresponding to the subarea to an electronic device of a user.

2. The sensor equipped drone assembly of claim 1, wherein the drone is a quadcopter, such that the drone is configured for hovering.

3. The sensor equipped drone assembly of claim 1, wherein the sensing module comprises sensors configured for one or more of fault detection, fracture detection, hydrothermal rock alteration, and ionizing radiation.

4. The sensor equipped drone assembly of claim 1, further including a data storage module engaged to and positioned in the central hub of the drone, the data storage module being operationally engaged to the microprocessor, such that the microprocessor is positioned for selectively sending the electromagnetic sensing output, the coordinates, and the image corresponding to the subarea to the data storage module.

5. The sensor equipped drone assembly of claim 1, further including a set of legs engaged to and extending from the underside of the central hub, such that the legs bracket and extend past the sensing module and the camera, wherein the legs are configured for preventing the sensing module and the camera from contacting a surface upon landing of the drone upon the surface.

6. A mineral detection assembly comprising:
   a housing defining an interior space and being configured for being mounted to an underside of a drone, the drone being configured for being remotely controlled for flying the drone above a search area;
   a sensing module engaged to the housing and being configured for detecting electromagnetic radiation, wherein the sensing module is configured for detecting electromagnetic radiation emanating from a subarea within the target area;
   a camera engaged to the housing, wherein the camera is configured for selectively capturing an image of the subarea; and
   a microprocessor, a power cell, a first transceiver, and a second transceiver are engaged to the housing and are positioned in the interior space, the first transceiver being configured for wireless communication, such that the first transceiver is configured for wirelessly communicating with an electronic device of a user, the second transceiver being global positioning system enabled, such that the second transceiver is configured for receiving and sending coordinates corresponding to a location of the subarea, the microprocessor being operationally engaged to the power cell, the first transceiver, the second transceiver, the sensing module, and the camera, such that the microprocessor is positioned for selectively motivating the first transceiver for communicating an electromagnetic sensing output, coordinates, and an image corresponding to the subarea to the electronic device of the user.

7. The sensor equipped drone assembly of claim 6, wherein the sensing module comprises sensors configured for one or more of fault detection, fracture detection, hydrothermal rock alteration, and ionizing radiation.

8. The sensor equipped drone assembly of claim 6, further including a data storage module engaged to the housing and positioned in the interior space, the data storage module being operationally engaged to the microprocessor, such that the microprocessor is positioned for selectively sending the electromagnetic sensing output, the coordinates, and the image corresponding to the subarea to the data storage module.

9. A remotely flyable mineral detection assembly comprising:
   a drone, the drone comprising a first transceiver, such that the drone is configured for being remotely controlled for flying the drone above a search area, the drone being a quadcopter, such that the drone is configured for hovering;
   a sensing module engaged to an underside of a central hub of the drone and being configured for detecting electromagnetic radiation, wherein the sensing module is configured for detecting electromagnetic radiation emanating from a subarea within the target area, the sensing module comprising sensors configured for one or more of fault detection, fracture detection, hydrothermal rock alteration, and ionizing radiation;
   a camera engaged to the underside of the central hub, wherein the camera is configured for selectively capturing an image of the subarea;
   a microprocessor and a second transceiver engaged to and positioned in the central hub of the drone, the second transceiver being global positioning system enabled, such that the second transceiver is configured for receiving and sending coordinates corresponding to a location of the subarea, the microprocessor being operationally engaged to a battery of the drone, the second transceiver, the first transceiver, the sensing module, and the camera, such that the microprocessor is positioned for selectively motivating the first transceiver for communicating an electromagnetic sensing output, coordinates, and an image corresponding to the subarea to an electronic device of a user;
   a data storage module engaged to and positioned in the central hub of the drone, the data storage module being operationally engaged to the microprocessor, such that the microprocessor is positioned for selectively sending the electromagnetic sensing output, the coordinates, and the image corresponding to the subarea to the data storage module; and
   a set of legs engaged to and extending from the underside of the central hub, such that the legs bracket and extend past the sensing module and the camera, wherein the legs are configured for preventing the sensing module and the camera from contacting a surface upon landing of the drone upon the surface.

* * * * *